United States Patent [19]

Pan et al.

[11] Patent Number: 5,798,957

[45] Date of Patent: Aug. 25, 1998

[54] LNS-BASED COMPUTER PROCESSOR AND METHOD OF USE THEREOF

[75] Inventors: ShaoWei Wei Pan, Lake Zurich; Shay-Ping T. Wang, Long Grove, both of Ill.

[73] Assignee: Motorola Inc., Schaumburg, Ill.

[21] Appl. No.: 583,141

[22] Filed: Dec. 28, 1995

[51] Int. Cl.$^6$ ........................................................ G06F 7/38
[52] U.S. Cl. ........................................ 364/748.5; 364/729
[58] Field of Search ................................. 364/748.5, 721, 364/729, 735

[56] References Cited

U.S. PATENT DOCUMENTS

| | | | |
|---|---|---|---|
| 3,371,197 | 2/1968 | Munson | 364/748.5 |
| 4,555,768 | 11/1985 | Lewis, Jr. et al. | 364/748.5 |
| 4,626,825 | 12/1986 | Burleson et al. | 340/347 DD |
| 4,720,809 | 1/1988 | Taylor | 364/748.5 |
| 5,184,317 | 2/1993 | Pickett | 364/735 |
| 5,187,677 | 2/1993 | Kovalick | 364/721 |
| 5,331,582 | 7/1994 | Sudo et al. | 364/722 |
| 5,365,465 | 11/1994 | Larson | 364/748 |

OTHER PUBLICATIONS

"A 10-ns Hybrid Number System Data Execution Unit for Digital Signal Processing Systems," IEEE Journal of Solid-State Circuits, vol. 26, No. 4, Apr. 1991; Fang-shi Lai.

"A 3.84 GIPS Integrated Memory Array Processor with 64 Processing Elements and a 2-Mb SRAM," IEEE Journal of Solid-State Circuits, vol. 29, No. 11, Nov. 1994; Nobuyuki Yamashita et al.

"A Hybrid Number System Processor with Geometric and Complex Arithmetic Capabilities," IEEE Transactions On Computers, vol. 40, No. 8, Aug. 1991; Fang-shi Lai et al.

"The Efficient Implementation and Analysis of a Hybrid Number System Processor," IEEE Transactions On Circuits and Systems—II: Analog and Digital Signal Processing, vol. 40, No. 6, Jun. 1993; Fang-shi Lai.

Primary Examiner—David H. Malzahn
Attorney, Agent, or Firm—Michael K. Lindsey; Jeffrey G. Toler

[57] ABSTRACT

An LNS-based computer processor is provided for performing high-speed calculations that involve special function values. Special functions include transcendental and hyperbolic functions. The computer processor includes a decoder (11), a memory circuit (12) for storing a plurality of special function signals, a log converter (14), at least one processing element (16), and an inverse-log converter (18).

18 Claims, 2 Drawing Sheets

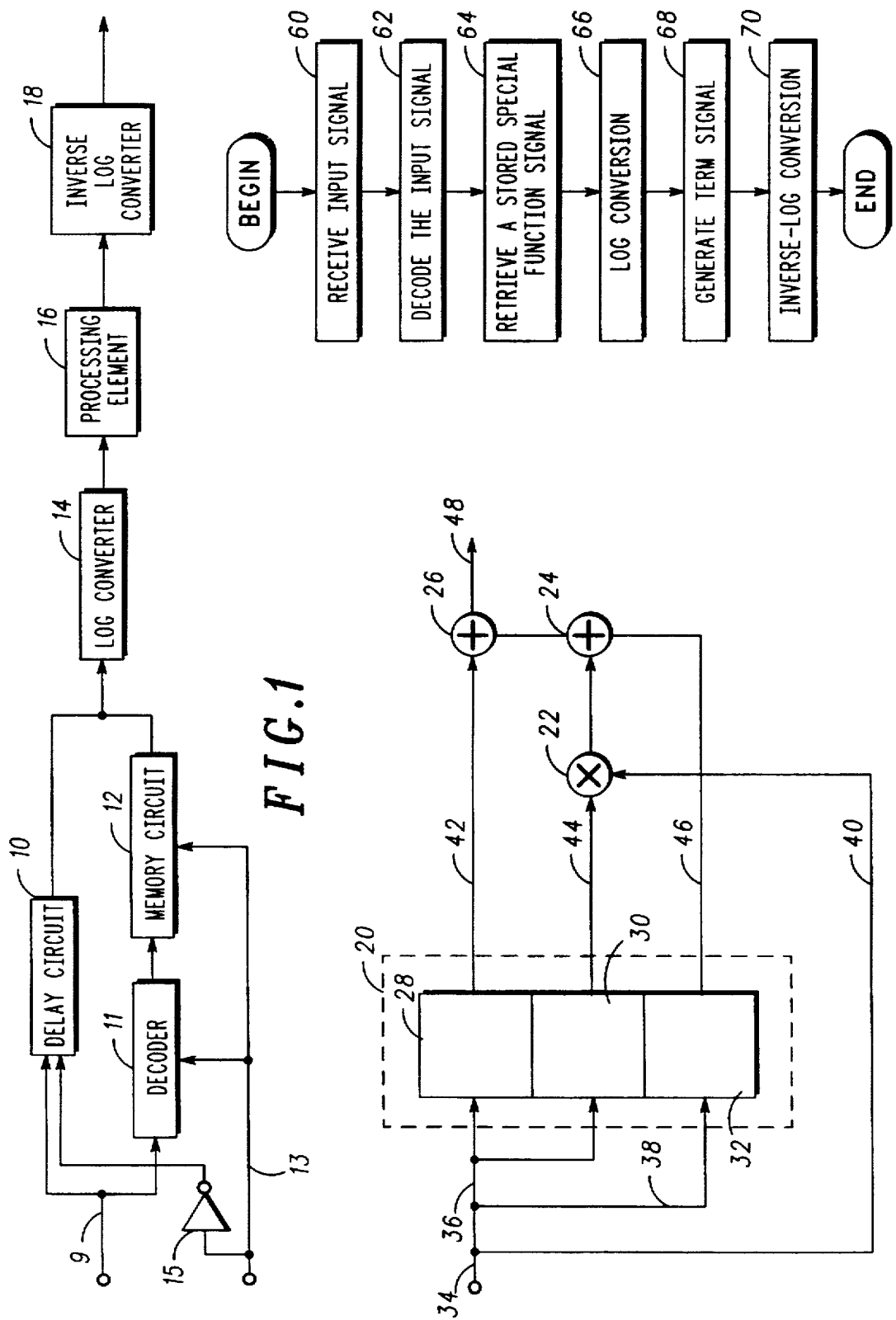

LNS-BASED COMPUTER PROCESSOR AND METHOD OF USE THEREOF

RELATED INVENTIONS

The present invention is related to the following inventions which are assigned to the same assignee as the present invention:

(1) "Logarithm/Inverse-Logarithm Converter Utilizing Second-Order Term and Method of Using Same" having Ser. No. 08/382,467, filed Jan. 31, 1995.

(2) "Exponentiation Circuit Utilizing Shift Means and Method of Using Same" having Ser. No. 08/401,515, filed Mar. 10, 1995.

(3) "Computer Processor having a Pipelined Architecture which Utilizes Feedback and Method of Using Same" having Ser. No. 08/520,145, filed Aug. 28, 1995.

The subject matter of the above-identified related inventions is hereby incorporated by reference into the disclosure of this invention.

TECHNICAL FIELD

The present invention relates generally to computer processors and, in particular, to a computer processor that performs arithmetic operations using a logarithmic number system (LNS).

BACKGROUND OF THE INVENTION

Computer processors are well known and widely used for a variety of purposes. One application of computer processors is digital signal processing (DSP). By definition, digital signal processing is concerned with the representation of signals by sequences of numbers or symbols and the processing of these signals. DSP has a wide variety of applications and its importance is evident in such fields as pattern recognition, radio communications, telecommunications, radar, biomedical engineering, and many others.

At the heart of every DSP system is a computer processor that performs mathematical operations on signals. Generally, signals received by a DSP system are first converted to a digital format used by the computer processor. Then, the computer processor executes a series of mathematical operations on the digitized signal. The purpose of these operations may be to estimate characteristic parameters of the signal or to transform the signal into a form which is in some sense more desirable. Such operations typically implement complicated mathematics and entail intensive numerical processing. Examples of mathematical operations that may be performed by computer processor include matrix multiplication, matrix-inversion, Fast Fourier Transforms (FFT), auto and cross correlation, Discrete Cosine Transforms (DCT), polynomial equations, and difference equations in general, such as those used to approximate Infinite Impulse Response (IIR) and Finite Impulse Response (FIR) filters.

In addition, some processors compute special functions. A special function is a transfer function that transforms an input to an output according to either a transcendental function or hyperbolic function.

A function $y=f(x)$ is a transcendental function of $x$ if it satisfies an equation of the form $$P_n(x)y^n + \ldots + P_1(x)y + P_0(x) = 0 \quad (1)$$

in which the coefficients $P_0(x), P_1(x), \ldots, P_n(x)$ are polynomials in x. The six basic transcendental functions are trigonometric functions: sine, cosine, tangent, and the inverses thereof.

Hyperbolic functions include cosh, tanh, sinh, and the inverses thereof.

Transcendental and hyperbolic functions are useful in solving a wide variety of problems that arise in science and engineering. For example, the tension at any point in a hanging cable, such as an electric transmission line, is calculated using hyperbolic functions.

Computer processors vary considerably in design and function. One aspect of a processor design is its architecture. Generally, the term computer architecture refers to the instruction set and organization of a processor. An instruction set is a group of programmer-visible instructions used to program the processor. The organization of a processor, on the other hand, refers to its overall structure and composition of computational resources, for example, the bus structure, memory arrangement, and number of processing elements.

There are many different computer architectures, ranging from complex-instruction-set-computer (CISC) to reduced-instruction-set-computer (RISC) based architectures. In addition, some architectures have only one processing element, while others include two or more processing elements. Despite differences in architectures, all computer processors have a common goal, which is to provide the highest performance at the lowest cost. However, the performance of a computer processor is highly dependent on the problem to which the processor is applied, and few, if any, low-cost computer processors are capable of performing the mathematical operations listed above at speeds required for some of today's more demanding applications.

Thus, there is a need for a computer processor that executes mathematical operations at high speeds, while remaining inexpensive. In addition, there is a need for a computer processor that enjoys a high data throughput rate. Such a processor should also be small and consume relatively little power.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 shows a block diagram of a computer processor that is in accordance with one embodiment of the present invention.

FIG. 2 illustrates a detailed block diagram of a converter that can function as either the log or inverse-log converter shown in FIG. 1.

FIG. 3 shows a flow diagram representing a method of using the computer processor of FIG. 1 that is in accordance with another embodiment of the present invention.

DETAILED DESCRIPTION OF A PREFERRED EMBODIMENT

Figure 4:
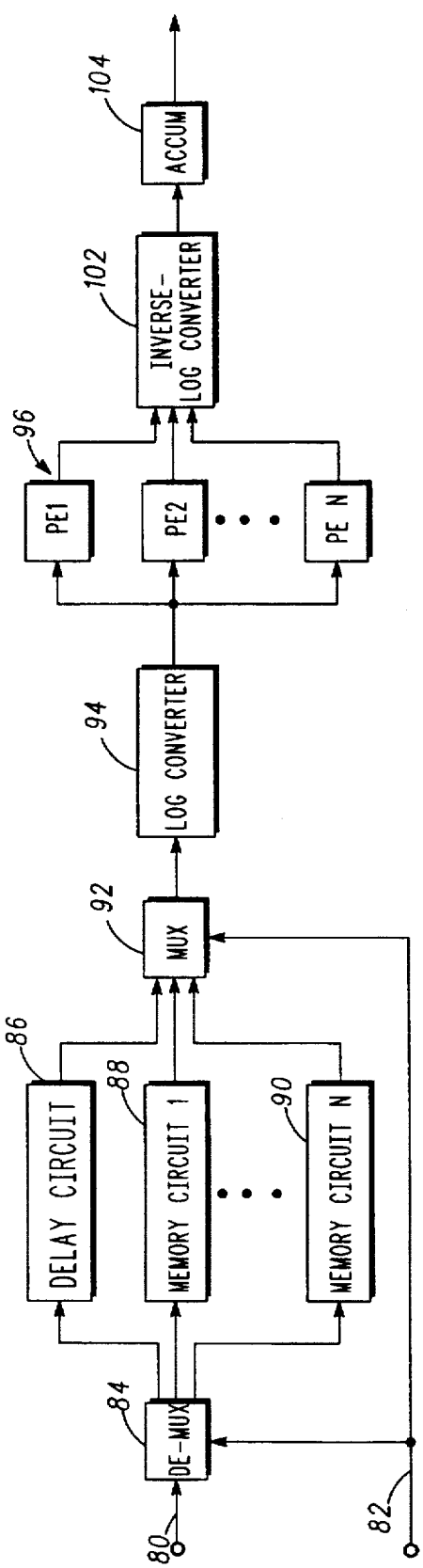
FIG. 4 shows a block diagram of a computer processor that is in accordance with an alternative embodiment of the present invention.

Generally, the present invention provides a computer processor that receives at least one input signal and, in turn, generates at least one output signal. The input and output signals are typically construed as being digital words that represent numeric data.

It is an advantage of the present invention to provide a computer processor that calculates special functions with a high data throughput. It is also an advantage of the present invention to provide a computer processor that is capable of performing high-speed, sophisticated mathematical operations that involve both special function values and other, non-special function values. A further advantage of the present invention is that it provides a computer processor that is efficiently implemented in a microchip, and is consequently small and consumes relatively little power.

FIG. 1 shows a block diagram of a computer processor that is in accordance with one embodiment of the present invention. The computer processor comprises a delay circuit 10, a decoder 11, a memory circuit 12, a log converter 14, a processing element 16, and an inverse-log converter 18. The LNS used by the computer processor is preferably a base two system.

The operation of the computer processor is described in the following. An input signal 9 is distributed to the delay circuit 10 and the decoder 11. In response to the input signal 9, the decoder 11 generates a corresponding memory address. The memory address is then passed to the memory circuit 12.

The memory circuit 12 stores a look-up table of special function signals associated with a particular special function, such as sine, cosine, tangent, or hyperbolic function. The memory circuit 12 can be a SRAM, DRAM, ROM, or a plurality of registers. Upon receiving the memory address, the memory circuit 12 outputs a corresponding special function signal that is transmitted to the log converter 14.

The log converter 14 performs a logarithmic transfer function on the special function signal to generate a log signal. The log converter 14 preferably converts floating point numbers to fixed point log signals in a base two number system.

In response to the log signal, the processing element 16 generates a term signal by performing at least one arithmetic operation involving the log signal. The processing element 16, in a broad sense, is a device that performs logical or arithmetical operations on data it receives. For example, a processing element may be as simple as an adder circuit that sums two values, or it may be a complex as a central processing unit (CPU) which performs a wide variety of different operations. The processing element 16 performs one or more operations which result the term signal being generated as output. In one embodiment of the present invention, the processing element 16 produces the term signal based on an equation:

$$y = w + x \quad (2)$$

In Equation (2), y represents the term signal, w represents a coefficient value, and x represents the log signal.

In a preferred embodiment of the present invention, the processing element 16 generates the term signal from a sequence of log signals, based on the following equation:

$$y = w + \sum_{i=m}^{n} g_i x_i \quad (3)$$

In Equation (3), y represents the term signal, w represents a coefficient value, $x_i$ represents an ith log signal received by the processing element 16, $g_i$ represents an exponent value corresponding to the ith log signal, and i, m and n are any integers.

The internal structure of the processing element 16 is preferably based on the architectures disclosed in above-identified Related Invention No. 2, Ser. No. 08/401,515.

The inverse-log converter 18 performs an inverse-logarithmic conversion on the term signal to generate an inverse-log signal. Preferably, the inverse-log signal represents a floating point number. The inverse-log signal alone can represent the output of the computer processor or it can be combined with other data signals to produce the processor output.

The delay circuit 10 allows the input signal 9 to bypass the decoder 11 and memory circuit 12. Generally, the delay circuit 10 performs an identity function, y=f(x)=x, where x represents the input signal 9 and y represents the delay circuit 10 output. The delay circuit 10 can be a buffer, register, or any other means for holding the input signal 9 for a finite period of time and then providing it to the log converter 14. Preferably, the period of time is equivalent to the latent period encountered between the arrival of the input signal 9 at the decoder 11 and the output of the corresponding special function signal by the memory circuit 12. The delay circuit 10 allows the computer processor to directly interlace a sequence of pristine input signals with special function signals without creating a resource conflict at the input of the log converter 14.

Alternatively, the delay circuit 10 can provide a delay that is much smaller than the latent period of the decoder 11/memory circuit 12 transmission path. This embodiment of the delay circuit 10 allows the pristine input signal as well as its corresponding special function signal to arrive at the log converter 14 without conflict.

An enable signal 13 is applied to the decoder 11 and the memory circuit 12 to allow these components to process the input signal 9. The enable signal 13 is also applied to an inverter 15 to produce an inverse-enable signal that is applied to the delay circuit 10. Essentially, the enable signal 13 controls whether the input signal 9 is processed by either the delay circuit 10 or the decoder 11 and memory circuit 12. When the enable signal 13 is active, the output of the memory circuit 12 is enabled so that special function signals will arrive at the log converter 14. During the enable-active state, the output of the delay circuit 10 is placed in a high-impedance state. Conversely, when the enable signal 13 is inactive, the memory circuit 12 output is held in high-impedance while the delay circuit 10 output is enabled. This prevents bus contention at the input to the log converter 14. To reduce power consumption, the enable signal 13 selectively enables the input of the decoder 11.

FIG. 1 shows just one exemplary configuration for controlling the data paths through the computer processor. It will be apparent to one of ordinary skill in the art that there are many alternative circuit configurations for selecting the data path taken by the input signal 9. For example, a multiplexer/de-multiplexer pair can instead be used to select between the data paths.

FIG. 2 illustrates a detailed block diagram of a converter that can function as either the log or inverse-log converter of FIG. 1. The converter comprises a log memory 20, a multiplier 22, a first adder 24, and a second adder 26. The log memory 20 stores a plurality of second-order parameters and a plurality of parameter pairs.

The parameter pairs and second-order parameters are calculated using a least squares method to estimate either a log or an inverse-log function over a domain of input signals. Each parameter pair has a zero-order parameter, which is stored in a zero-order look-up table 28, and a first-order parameter which is stored in a first-order look-up table 30. The second-order parameters are stored in a second-order look-up table 32.

The converter operates as follows. An input signal 34 provides an address 36 which is used to retrieve a corresponding parameter pair from the zero-order and first-order look-up tables 28–30. The input signal 34 is a binary signal having a length of 23-bits, denoted by |22:0|, wherein the most significant nine bits, |22:14|, of the input signal 34 are provided to the log memory 20 as the address 36. Additionally, the zero-order and first-order parameters 42–44 are located in the log memory 20 at a common address which corresponds to the input signal 34. A second-order parameter address 38 is also derived from the input signal 34. The second-order parameter address is used to retrieve the second-order parameter 46 from the second-order look-up table 32.

The input signal 34 is a binary signal having an upper portion and a lower portion. The second-order parameter 46 is retrievable from the log memory 20 using a first bit slice from the upper portion concatenated with a second bit slice from the lower portion.

Preferably, the input signal 34 has a length of 23 bits, denoted by [22:0], where the upper portion includes the most significant nine bits, [22:14], and the lower portion includes the remaining 14 bits, [13:0]. The second-order parameter address 38 is a nine-bit value, which comprises the most significant four bits of the upper portion concatenated with the most significant five bits of the lower portion, i.e., bits [22:19][13:9] of the input signal 34.

The log memory 20 provides as output the zero-order parameter 42, the first-order parameter 44, and the second-order parameter 46 which correspond to the input signal 34. Preferably, the zero-order parameter 42 is a 24-bit binary value, the first-order parameter 44 is a 15-bit value, and the second-order parameter 46 is a 9-bit value. A total of 512 parameter pairs and 512 second-order parameters are stored in the log memory 20.

The multiplier 22 multiplies the first-order parameter 44 by the bit slice 40 to produce a proportional signal. Although the bit slice 40 may include the entire input signal 34, it preferably includes the fourteen least significant bits, [13:0], of the input signal 34. The first adder 24 sums the proportional signal and the second-order parameter 46 to produce a first sum. In turn, the second adder 26 sums the first sum and the zero-order parameter 42 to produce an output signal 48. The output signal 48 is preferably 23 bits in length.

The converter of FIG. 2 may easily be re-configured to perform log or inverse-log conversions, or functions having a different base number system or domain of inputs, by loading the log memory 20 with a different set of parameter pairs and second-order parameters.

An IEEE standard 32-bit floating point number is easily converted to a log value using the converter of FIG. 2. Values represented by IEEE floating point numbers have one sign bit, a 23-bit mantissa, and an 8-bit exponent. Only the mantissa is provided to the converter as the input signal 34. Both the sign bit and exponent bypass the converter and are later combined with the output signal 48 (not shown) to produce the log signal. Essentially, the converter computes either $y=\log_2(1.M)$, where y represents the output signal 48 and M represents the mantissa. The exponent of the floating point number is a base-two value, $2^e$, where e represents the exponent. A log signal corresponding to the floating point number is generated by summing of the output signal 48 and the exponent following conversion of the mantissa. This summation results in a value which is represented in a fixed point number format having a j-bit fractional portion and a k-bit integer portion. The integers j and k can vary, depending on the desired precision of the converter.

To perform an inverse-log conversion on the fixed point number, fractional portion is provided to the converter as the input signal 34. The converter computes an output signal 48 having the form $y=\log_2^{-1}(1.F)$, where F represents the fractional portion. The sign bit and integer portion bypass the converter and are later combined (not shown) with the output signal 48 to produce the inverse-log signal in accordance with the IEEE floating point standard. This is accomplished by equating the integer portion to the exponent of a floating point number and the output signal 48 to the mantissa.

FIG. 3 shows a flow diagram representing a method of using the computer processor of FIG. 1 that is in accordance with another embodiment of the present invention. In box 60, at least one input signal 9 is received by the computer processor. The input signal 9 is preferably a digital word having a plurality of bits. Next, in box 62, the input signal 9 is decoded to produce a memory address. In box 64, the special function signal corresponding to the memory address is retrieved from the memory circuit 12. In box 66, a logarithmic conversion is performed on the special function signal to generate the log signal. In box 68, the term signal is generated by performing at least one arithmetic operation involving the log signal. In box 70, an inverse-logarithmic conversion is performed on the term signal to generate the output signal.

FIG. 4 shows a block diagram of a computer processor that is in accordance with an alternative embodiment of the present invention. In contrast to the computer processor of FIG. 1, the processor depicted by FIG. 4 is capable of storing special function signals for a plurality of different special functions. In addition, this embodiment of the computer processor includes more than one memory circuit, thus easing integrated circuit design by providing more degrees of freedom in choosing a physical layout. Furthermore, the partitioning of the memory into separate circuits provides a reduction in power consumption by allowing selective activation of only those memory circuits being used at a particular instance.

The computer processor of FIG. 4 comprises a de-multiplexer 84 (DE-MUX), a delay circuit 86, a plurality of memory circuits 88–90, a multiplexer 92 (MUX), a log converter 94, a plurality of processing elements 96 (PEs), and an inverse-log converter 102, and an accumulator 104.

The operation of the computer processor is described in the following. An input signal 80 is received by the DE-MUX 84. The DE-MUX 84 selectively provides the input signal 80 to the delay circuit 86 or any of the memory circuits 88–90. An address signal 82 is received concomitantly with the input signal 80 by both the DE-MUX 84 and MUX 92. The address signal 82 is used to select a corresponding transmission path through one of the delay or memory circuits 86–90.

The delay circuit 86 basically performs the same function as the delay circuit 10 described in reference to FIG. 1. However, the delay circuit 86 of FIG. 4 typically does not require a three-state output.

Each of the memory circuits 88–90 can store a plurality of special function signals associated with a particular special function, such as sine, cosine, tangent, or hyperbolic function. Consequently, the address signal 82 selects the transfer function performed on the input signal 80, be it a special function or an identity function provided by the delay circuit 86. The memory circuits 88–90 can be SRAMs, DRAMs, ROMs, a plurality of registers, or any combination thereof. Upon receiving the input signal 80, the selected memory circuit outputs a corresponding special function signal that is transmitted to the MUX 92.

The MUX 92 selectively provides a transmission path between the log converter 94 and the delay and memory circuits 86–90. The transmission path is selected according to the address signal 82.

The log converter 94 performs a logarithmic transfer function on MUX 92 output to generate a log signal. The functions and structure of the log converter 94 are described herein in conjunction with FIGS. 1 and 2.

The processing elements 96 generate a plurality of term signals by performing arithmetic operations involving the log signal. Each of the processing elements 96 preferably includes the features and functions described in conjunction with the processing element 16 of FIG. 1

The inverse-log converter 102 performs inverse-logarithmic conversions on the term signals to generate a plurality of inverse-log signals. The basic functions and structure of the inverse-log converter 102 are described herein in conjunction with FIGS. 1 and 2. However, in addition to these features, the inverse-log converter 102 of FIG. 4 can include a means for concurrently receiving the term signals.

The accumulator circuit 104 sums the inverse-log signals to produce at least one output signal. By summing a the inverse-log signals, the accumulator 104 can generate a processor output signal representative of a polynomial expansion having the form $$y = \sum_{i=0}^{m} w_i \left[ \prod_{j=0}^{n} \{f(x_j)\} g_{ji} \right] \quad (4)$$

In Equation (4), $x_j$ represents a plurality of input signals, i, j, m and n are integers, y represents the output signal, $w_i$ represents a coefficient, $g_{ji}$ represents an exponent, and f represents an identity function or a special function.

An exemplary polynomial that includes both special function signals and regular input signal is given below:

$$y = w_1 x_1 + w_2 x_2 + w_3 x_1 x_2 + w_4 \sin(x_2) + w_5 x_2^2 + w_6 \tan h^2(x_3) \quad (5)$$

In Equation (5), y represents the output signal and $x_i$ represents input signals. A first special function signal could represent the term $\sin(x_2)$, while a second special function signal would represent $\tanh(x_3)$.

FIG. 4 shows just one exemplary circuit configuration for the computer processor. It will be apparent to one of ordinary skill in the art that there are many alternative circuit configurations that embody the spirit and scope of the present invention. For example, a single processing element can be used instead of the plurality of processing element 96. Such a configuration reduces the overall size of the processor, but reduce the data throughput rate. Another alternative configuration can provide a plurality of inverse-log converters have a one-to-one correspondence with the processing elements 96. This configuration increases data throughput, but at the expense of size and power increases.

A further alternative configuration can use a single memory circuit rather than the plurality of memory circuits 88–90. The single memory circuit can have a memory space that is partitioned into a plurality of pages. Each page would correspond to a particular address signal and contain special functions signals of a particular special function. This configuration reduces the complexity of the DE-MUX 84 and MUX 92. However, it may require a large single memory circuit that would limit design choices during implementation in an integrated circuit (IC).

Figure 5:
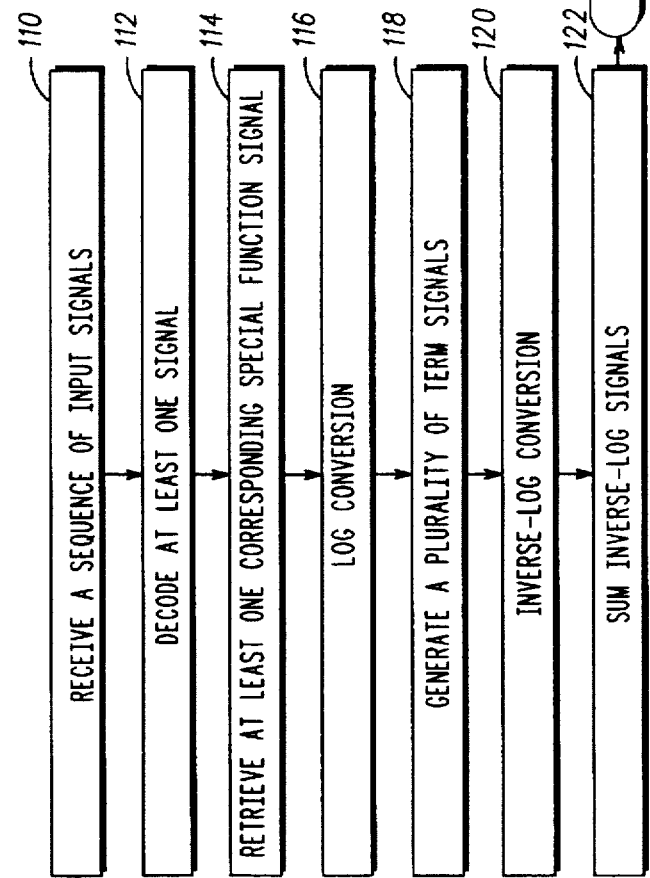
FIG. 5 shows a flow diagram representing a method of using the computer processor of FIG. 4 that is in accordance with a further embodiment of the present invention.

FIG. 5 shows a flow diagram representing a method of using the computer processor of FIG. 4 that is in accordance with a further embodiment of the present invention. In contrast to the flow diagram shown in FIG. 3, this flow diagram depicts the inter-mixed processing of pristine input signals with special function signals.

In box 110, a sequence of input signals are received by the computer processor. In this method, an input signal includes both the input signal 80 and the address signal 82 described in conjunction with FIG. 4.

Next, in box 112, at least one of the input signals is decoded to produce at least one memory address. A determination as to whether a particular input signal is decoded is based on the address portion of the input signal. The remaining, non-decoded input signals bypass the memory circuits 88–90 through the delay circuit 86.

In box 114, at least one special function signal corresponding to the at least one memory address is retrieved from a selected one of the memory circuits 88–90.

In box 116, a logarithmic conversion is performed on the retrieved special function signal to generate at least one special function log signal. In addition, the conversion is also performed on the non-decoded input signals from the delay circuit 86 to produce corresponding log signals.

In box 118, the term signals are generated by the processing elements 96 performing arithmetic operations involving the log signals and the at least one special function log signal.

In box 120, an inverse-logarithmic conversion is performed on the term signals to generate the inverse-log signals. In box 122, the accumulator circuit 104 sums the inverse-log signals to generate the output signal.

In summary, there has been described herein a concept, as well as a preferred embodiment, of a computer processor which may be used to compute special functions. Because the various embodiments of the processor as herein-described utilize a memory for storing special function values that is coupled with LNS-based processing elements, they can perform sophisticated math functions at dramatically improved data throughput rates. Moreover, the processor of the present invention provides a delay circuit that allows regular input signals to be interlaced during processing.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A computer processor, which comprises:

a decoder for decoding an input signal to generate a memory address;

a memory circuit for storing a plurality of special function signals, the memory circuit outputting a corresponding special function signal in response to the memory address;

a log converter for performing a logarithmic conversion on the corresponding special function signal to generate a log signal, the log converter comprising a log memory for storing a plurality of log parameters and a plurality of second-order log parameters, the log memory providing as output ones of the log parameters and a second-order log parameter which correspond to the special function signal and log arithmetic means, operatively coupled to the log memory, for generating the log signal by performing arithmetic operations involving the special function signal, the ones of the log parameters, and the second-order log parameter, wherein the plurality of log parameters are calculated using a least squares method to estimate a logarithmic function over a domain of special function signals;

a processing element for generating a term signal by performing at least one arithmetic operation involving the log signal; and an inverse-log converter for performing an inverse-logarithmic conversion on the term signal to generate an inverse-log signal.

2. The computer processor of claim 1, wherein the corresponding special function signal represents a value of a transcendental function or a hyperbolic function.

3. The computer processor of claim 1, further comprising:

an accumulator circuit for summing the inverse-log signal and at least one other signal representing a numeric value to produce an output signal.

4. The computer processor of claim 1, further comprising:

a delay circuit, operatively coupled to the log converter, for allowing an input signal to bypass the decoder and the memory circuit.

5. A computer processor, which comprises:

a plurality of memory circuits for storing a plurality of special function signals;

a de-multiplexer for selectively providing a first transmission path between an input bus and a particular memory circuit of the plurality of memory circuits;

a multiplexer for selectively providing a second transmission path between a data bus and the particular memory circuit;

wherein a data signal is receivable by the input bus and transmittable to the particular memory circuit via the first transmission path according to an address signal associated with the data signal, the particular memory circuit producing a corresponding special function signal in response to the data signal, the corresponding special function signal being transmittable to the data bus via the second transmission path;

a log converter, operatively couple to the data bus, for performing a logarithmic conversion on the corresponding special function signal to generate a log signal;

a processing element for generating a term signal by performing at least one arithmetic operation involving the log signal; and an inverse-log converter for performing an inverse-logarithmic conversion on the term signal to generate an inverse-log signal.

6. The computer processor of claim 5, wherein each of the plurality of memory circuits stores the plurality of special function signals associated with a respective special function.

7. The computer processor of claim 5, wherein the corresponding special function signal represents a value of a transcendental function or a hyperbolic function.

8. The computer processor of claim 5, further comprising:

an accumulator circuit for summing the inverse-log signal and at least one other signal representing a numeric value to produce an output signal.

9. The computer processor of claim 5, further comprising:

a delay circuit, operatively coupled to the de-multiplexer and the multiplexer, for allowing the data signal to bypass the plurality of memory circuits.

10. The computer processor of claim 5, wherein the log converter comprises:

a log memory for storing a plurality of log parameters and a plurality of second-order log parameters, the log memory providing as output ones of the log parameters and a second-order log parameter which correspond to the corresponding special function signal; and log arithmetic means, operatively coupled to the log memory, for generating the log signal by performing arithmetic operations involving the corresponding special function signal, the ones of the log parameters, and the second-order log parameter;

wherein the plurality of log parameters are calculated using a least squares method to estimate a logarithmic function over a domain of special function signals.

11. The computer processor of claim 5, wherein the inverse-log converter comprises:

an inverse-log memory for storing a plurality of inverse-log parameters and a plurality of second-order inverse-log parameters, the inverse-log memory providing as output ones of the inverse-log parameters and a second-order inverse-log parameter which correspond to the term signal; and inverse-log arithmetic means, operatively coupled to the inverse-log memory, for generating the inverse-log signal by performing arithmetic operations involving the term signal, the ones of the inverse-log parameters, and the second-order inverse-log parameter;

wherein the plurality of inverse-log parameters are calculated using a least squares method to estimate an inverse-logarithmic function over a domain of term signals.

12. A computer processor, which comprises:

a memory circuit for storing a plurality of special function signals;

a delay circuit for allowing a data signal to bypass the memory circuit;

a de-multiplexer for selectively providing a first transmission path between an input bus and either the memory circuit or the delay circuit;

a multiplexer for selectively providing a second transmission path between a data bus and either the memory circuit or the delay circuit;

wherein the data signal is receivable by the input bus and transmittable to either the memory circuit or the delay circuit via the first transmission path according to an address signal associated with the data signal, the memory circuit producing a corresponding special function signal in response to the data signal, the corresponding special function signal being transmittable to the data bus via the second transmission path;

a log converter, operatively couple to the data bus, for performing a logarithmic conversion on the corresponding special function signal to generate a log signal;

a plurality of processing elements for generating a plurality of term signals by performing at least one arithmetic operation involving the log signal;

an inverse-log converter for performing an inverse-logarithmic conversion on the plurality of term signals to generate a plurality of inverse-log signals; and an accumulator circuit for summing the plurality of inverse-log signals to produce at least one output signal.

13. The computer processor of claim 12, wherein the plurality of special function signals represent a plurality of special functions.

14. The computer processor of claim 12, wherein the corresponding special function signal represents a value of a transcendental function or a hyperbolic function.

15. The computer processor of claim 12, wherein the log converter comprises:

- a log memory for storing a plurality of log parameters and a plurality of second-order log parameters, the log memory providing as output ones of the log parameters and a second-order log parameter which correspond to the corresponding special function signal; and
- log arithmetic means, operatively coupled to the log memory, for generating the log signal by performing arithmetic operations involving the corresponding special function signal, the ones of the log parameters, and the second-order log parameter;
- wherein the plurality of log parameters are calculated using a least squares method to estimate a logarithmic function over a domain of special function signals.

16. The computer processor of claim 12, wherein the inverse-log converter comprises:

- an inverse-log memory for storing a plurality of inverse-log parameters and a plurality of second-order inverse-log parameters, the inverse-log memory providing as output ones of the inverse-log parameters and a second-order inverse-log parameter which correspond to a term signal; and
- inverse-log arithmetic means, operatively coupled to the inverse-log memory, for generating an inverse-log signal by performing arithmetic operations involving the term signal, the ones of the inverse-log parameters, and the second-order inverse-log parameter;
- wherein the plurality of inverse-log parameters are calculated using a least squares method to estimate an inverse-logarithmic function over a domain of term signals.

17. The computer processor of claim 12, wherein the accumulator circuit generates the at least one output signal representative of a polynomial expansion having a form $$y = \sum_{i=0}^{m} w_i \left[ \prod_{j=0}^{n} \{f(x_j)\} g_{ji} \right];$$

wherein $x_j$ represents the plurality of input signals, i, j, m and n are integers, y represents the at least one output signal, $w_i$ represents a coefficient, $g_{ji}$ represents an exponent, and f represents an identity function or a special function.

18. A computer processor, which comprises:

- a decoder for decoding an input signal to generate a memory address;
- a memory circuit for storing a plurality of special function signals, the memory circuit outputting a corresponding special function signal in response to the memory address;
- a log converter for performing a logarithmic conversion on the corresponding special function signal to generate a log signal;
- a processing element for generating a term signal by performing at least one arithmetic operation involving the log signal; and
- an inverse-log converter for performing an inverse-logarithmic conversion on the term signal to generate an inverse-log signal, the inverse-log converter comprising an inverse-log memory for storing a plurality of inverse-log parameters and a plurality of second-order inverse-log parameters, the inverse-log memory providing as output ones of the inverse-log parameters and a second-order inverse-log parameter which correspond to the term signal and log arithmetic means, operatively coupled to the inverse-log memory, for generating the log signal by performing arithmetic operations involving the term signal, the ones of the inverse-log parameters, and the second-order inverse-log parameter;
- wherein the plurality of inverse-log parameters are calculated using a least squares method to estimate an inverse-logarithmic function over a domain of term signals.

* * * * *